US011028994B2

(12) United States Patent
Lin

(10) Patent No.: US 11,028,994 B2
(45) Date of Patent: Jun. 8, 2021

(54) ILLUMINATION MODULE, ILLUMINATION DEVICE, VEHICLE AND DRIVING METHOD OF ILLUMINATION DEVICE

(71) Applicant: AU OPTRONICS CORPORATION, Hsin-Chu (TW)

(72) Inventor: Cheng-Te Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/727,446

(22) Filed: Dec. 26, 2019

(65) Prior Publication Data
US 2020/0393105 A1    Dec. 17, 2020

(30) Foreign Application Priority Data

Jun. 14, 2019   (TW) .................... 108120771

(51) Int. Cl.
*F21S 41/64*   (2018.01)
*B60Q 1/08*   (2006.01)

(52) U.S. Cl.
CPC ............ *F21S 41/645* (2018.01); *B60Q 1/08* (2013.01); *B60Q 2300/112* (2013.01); *B60Q 2300/32* (2013.01)

(58) Field of Classification Search
CPC .......... B60Q 1/08; B60Q 1/085; B60Q 1/122; B60Q 2300/112; B60Q 2300/32; F21S 41/64; F21S 41/645; G02F 1/29–2955
USPC .......... 362/509–510, 513, 545, 561
See application file for complete search history.

(56) References Cited

U.S. PATENT DOCUMENTS

| | | | |
|---|---|---|---|
| 6,954,243 B2 | 10/2005 | Ota et al. | |
| 8,723,948 B2 | 5/2014 | Gotz et al. | |
| 9,108,566 B2 | 8/2015 | Simchak et al. | |
| 9,684,101 B2 | 6/2017 | Chin et al. | |
| 10,371,334 B2 | 8/2019 | Okubo | |
| 2008/0205075 A1 | 8/2008 | Hikmet et al. | |
| 2009/0245074 A1 | 10/2009 | Tseng | |
| 2015/0260884 A1 | 9/2015 | Chin et al. | |
| 2016/0077402 A1 | 3/2016 | Takehara et al. | |
| 2018/0073700 A1 | 3/2018 | Orisich et al. | |
| 2019/0061604 A1 | 2/2019 | Wang et al. | |
| 2019/0285933 A1 | 9/2019 | Chien et al. | |

FOREIGN PATENT DOCUMENTS

| | | |
|---|---|---|
| CN | 101852396 A | 10/2010 |
| CN | 201765418 U | 3/2011 |
| CN | 102393579 A | 3/2012 |
| CN | 203449739 | 2/2014 |
| CN | 108351080 A | 7/2018 |
| CN | 108791040 A | 11/2018 |

(Continued)

OTHER PUBLICATIONS

IPOS has issued the Office Action for the corresponding Singapore application dated Jul. 1, 2020.

*Primary Examiner* — Jason M Han
(74) *Attorney, Agent, or Firm* — WPAT, PC

(57) ABSTRACT

An illumination module including a light emitting unit and a first liquid crystal lens is provided. The light emitting unit emits illumination light. The first liquid crystal lens is arranged corresponding to the light emitting unit and receives the illumination light. The first liquid crystal lens is configured to converge, diverge or deflect the illumination light. An illumination device, a vehicle, and a driving method for the illumination device are also provided.

19 Claims, 9 Drawing Sheets

(56) References Cited

FOREIGN PATENT DOCUMENTS

| | | |
|---|---|---|
| DE | 102017209265 A1 | 12/2018 |
| KR | 20180106611 A | 10/2018 |
| TW | 092113738 | 12/2004 |
| TW | I242669 | 11/2005 |
| TW | I272417 | 2/2007 |
| TW | 200710344 A | 3/2007 |
| TW | I281082 | 5/2007 |
| TW | 201534973 A | 9/2015 |
| TW | I588571 | 6/2017 |

ILLUMINATION MODULE, ILLUMINATION DEVICE, VEHICLE AND DRIVING METHOD OF ILLUMINATION DEVICE

BACKGROUND OF THE INVENTION

1. Field of the Invention

The present disclosure relates to an optical module, an optical device, a mobile device, and a driving method of the optical device; specifically, it relates to an illumination module, an illumination device, a vehicle, and a driving method of the illumination device.

2. Description of the Prior Art

Along with the development of technologies, solid state light sources such as light emitting diodes have been applied to illumination in vehicles so that illumination with high brightness, low energy consumption, and no excessive heat can be provided. However, illumination with high brightness tends to interfere with other vehicles or pedestrians, the illumination with low brightness tends to make drivers unable to observe road conditions clearly. Providing suitable light to support drivers in respect to different situations is still a problem to be solved in the present technical field.

SUMMARY OF THE INVENTION

The present disclosure provides an illumination module that may provide suitable illumination light through liquid crystal lenses.

The present disclosure provides an illumination device configured to provide suitable light through a plurality of illumination modules.

The present disclosure provides a vehicle configured to provide suitable illumination based on environmental status.

The present disclosure provides a method for driving the illumination device that enables the illumination device to provide suitable illumination based on environmental status.

The illumination module provided by an embodiment of the present disclosure includes a light emitting unit and a first liquid crystal lens. The light emitting unit emits an illumination light. The first liquid crystal lens is arranged corresponding to the light emitting unit and the first liquid crystal lens receives the illumination light, and is configured to converge, diverge, or deflect the illumination light.

The illumination device provided by an embodiment of the present disclosure includes a plurality of illumination modules. the light emitting units of the light illumination modules are arranged to form a light emitting array. The liquid crystal lenses of the illumination modules are arranged to form a lens array.

A vehicle provided by an embodiment of the present disclosure includes at least one of the illumination devices, a sensor module, and a processing unit. The sensor module outputs a sensing signal, the processing unit is connected to the sensor module and the illumination devices. The processing unit is configured to provide a control signal to the illumination devices according to the sensing signal; the illumination devices are configured to control each of the first liquid crystal lenses of the illumination modules according to the control signal so as to converge or diverge the illumination light.

A method for driving the illumination device provided by an embodiment of the present disclosure includes: receiving a sensing signal from a sensor module and providing a control signal to the illumination device according to the sensing signal from a processing unit. The illumination device is configured to control each of the first crystal lenses of the illumination modules according to the control signal so as to converge, diverge, or deflect the illumination light.

As seen from the above, the illumination module provided by the present disclosure may converge, diverge, or deflect the illumination light. The illumination device provided by the present disclosure may provide a suitable illumination by the illumination light of the illumination modules. The vehicle provided by the present disclosure may control the illumination light emitted by each of the illumination modules according to the environmental status of the illumination device. The method for driving the illumination device provided by the present disclosure may provide a suitable illumination light by controlling the illumination device according to the sensing signal.

DETAILED DESCRIPTION OF THE PREFERRED EMBODIMENT

An illumination module, an illumination device, a vehicle, and a method for driving the illumination devices provided by the present disclosure will be described in detail through embodiments and with reference to FIG. 1 to FIG. 9C. A person having ordinary skill in the art may understand the advantages and effects of the present disclosure through the contents disclosed in the present specification. However, the contents shown in the following never limit the scope of the present disclosure. Without departing from the conception principles of the present invention, a person having ordinary skill in the present art may realize the present disclosure through other embodiments based on different views and applications.

In the attached FIGs, for the purpose of clarification, the basic structure of the present disclosure is illustrated as a simplified diagram. Therefore, the structure illustrated in the attached FIGs is not based on the actual shape and size. For example, for the purpose of description, the size of a specific element is amplified. It should be understood that, when an element such as a layer, a film, a panel, a region or a substrate are described as "being on" or "being connected to" another element, they may be directly on or connected to another element, or there may be other elements therebetween. On other hands, when an element is described as "directly exists on another element" or "directly connects to "another element, there is no element therebetween. As used in the present specification, a "connection" may be a physical and/or electrical connection. In addition, an "electrical connection" or "coupling" means that other elements may exist therebetween.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

If not defined specifically, all terms in the specifications (including terms about technology and science) have the same meaning as those understood by those who have ordinal skill in the art. It should be further understood that, for example, the terms defined in commonly used dictionaries should be interpreted as having a meaning that is consistent with their meaning in the context of the relevant art and the present disclosure, and should not be interpreted in an idealized or overly formal sense unless expressly so defined herein.

The First Embodiment

Figure 1A:
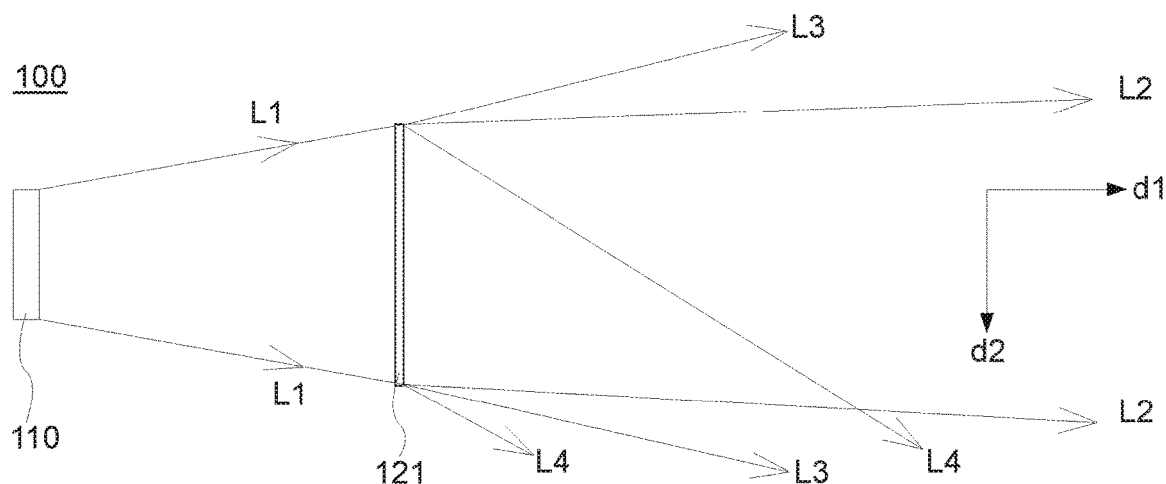
FIG. 1A is a diagram of an illumination module in the first embodiment of the present disclosure.

An illumination module provided by the present disclosure may be applied to any illumination devices, preferably may be applied to illumination devices that need to modulate irradiation areas and irradiation directions thereof according to different environmental statuses. FIG. 1A is a diagram of the illumination module in the first embodiment of the present disclosure. Please refer to FIG. 1A. In the first embodiment of the present disclosure, an illumination module 100 includes a light emitting unit 110 and a first liquid crystal lens 121. The light emitting unit 110 emits an illumination light L1, and the illumination light L1 is modulated appropriately through the first liquid crystal lens 121.

Please refer to FIG. 1A. The first liquid crystal lens 121 is disposed corresponding to the light emitting unit 110 and receives the illumination light L1. In addition, after modulating the convergence, divergence, or deflecting of the illumination light L1, the first liquid crystal lens 121 generates an illumination light L2, an illumination light L3 or an illumination light L4. In particular, in the present embodiment, through modulating the equivalent focal length of the first liquid crystal lens 121 to generate a convergence effect, the transmission direction of the illumination light L1 is modulated to generate illumination light L2 which has a smaller divergence and farther irradiation range; through modulating the equivalent focal length of the first liquid crystal lens 121 to generate a divergence effect, the transmission direction of the illumination light L1 is modulated to generate illumination light L3 which has a greater divergence, greater irradiation range, and shorter distance. The light emitting unit 110 of the present embodiment, for example, may be a light-emitting diode (LED) or a laser diode (LD), but the present disclosure is not limited thereto. The modulating effect provided by the first liquid crystal lens 121 is not limited to the abovementioned convergence or divergence; the transmission direction of the illumination light L1 may also be deflected. In particular, the illumination light L1 emitted by the light emitting unit 110 is originally transmitted essentially along a second direction d1, but the light may be deflected toward a third direction d2 through modulation of the first liquid crystal lens 121 such as by changing the moving direction of a portion of the liquid crystal molecules so that the illumination light L4 may be further provided.

It should be specially noted that, in the present embodiment, a single liquid crystal lens is used as an example of the first liquid crystal lens 121, but the present disclosure is not limited thereto. In another embodiment of the present disclosure, the first liquid crystal lens 121 may further include a plurality of liquid crystal lens or a single liquid crystal lens with another lens or a reflector, but the present disclosure is not limited thereto.

Figure 1B:
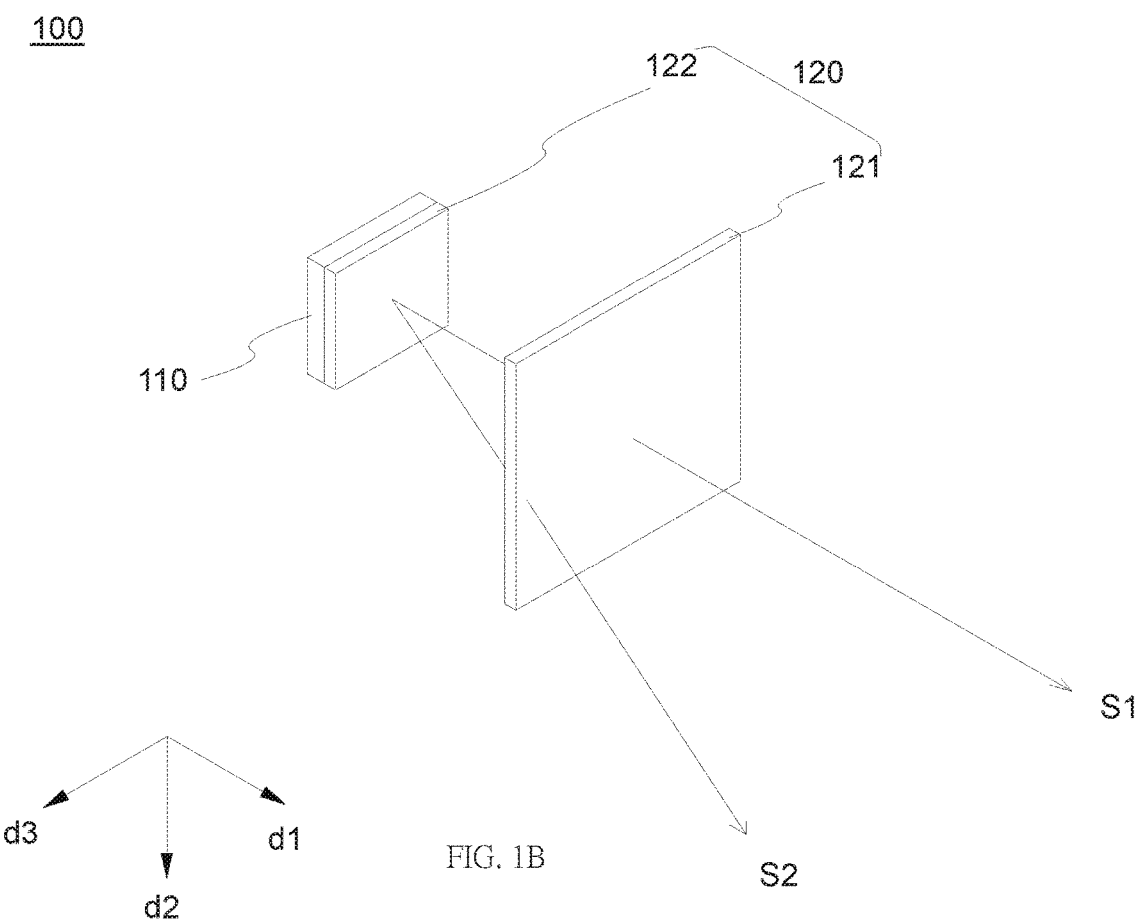
FIG. 1B is a three-dimensional diagram of the illumination module in the first embodiment of the present disclosure.

Please refer to FIG. 1B. In a modified embodiment of the present disclosure, the illumination module 100 includes a light emitting unit 110 and a liquid crystal lens set 120. The liquid crystal lens set 120 has a first liquid crystal lens 121 and a second liquid crystal lens 122, wherein the second liquid crystal lens 122 is disposed on the side of the liquid crystal lens set 120 adjacent to the light emitting unit 110 to receive the illumination light from the light emitting unit 110; the first liquid crystal lens 121 is disposed on the side of the liquid crystal lens set 120 away from the light emitting unit 110 to receive the illumination light from the second liquid crystal lens 122 and to emit illumination light toward the second direction d1.

The second liquid crystal lens 122 of the present embodiment may modulate the distribution of the illumination light irradiating the first liquid crystal lens 121. Specifically, the second liquid crystal lens 122 is configured to receive the illumination light from the light emitting unit 110; the first liquid crystal lens 121 is configured to receive the illumination light from the second liquid crystal lens 122; and the second liquid crystal lens 122 is configured to modulate the uniformity of the illumination light so that the first liquid crystal lens 121 may converge, diverge, or deflect the illumination light effectively. To modulate the uniformity of the light, the second liquid crystal lens 122 may divide each of the beams received into a plurality of smaller beams and diverge them toward a specific range or angle, for example, toward the divergence angle of 75 degrees where the path of the light transmission is the center.

In one embodiment, the second liquid crystal lens 122 is disposed to make the imaging of the second liquid crystal lens 122 the light source of the imaging of the first liquid crystal lens 121. In the present embodiment, the distance d between the first liquid crystal lens 121 and the second liquid crystal lens 122 preferably satisfies the following relationship:

$$0 \le d \le f_1 - v - \left(\frac{l'}{\tan\beta}\right)$$

wherein, $f_1$ is the focal length of the first liquid crystal lens, v is the image distance of the second liquid crystal lens, l' is half of the imaging length of the second liquid crystal lens, β is half of the angle of the beam of the illumination light.

The present disclosure is not limited to modulating the uniformity of the light using the second liquid crystal lens 122. The present invention may also be implemented through light diffuser plates or light guide plates in the other embodiments, but the present disclosure is not limited thereto. Furthermore, the liquid crystal lens set 120 of the present disclosure is not limited to be implemented through the first liquid crystal lens 121 and the second liquid crystal lens 122; in other embodiments, the present invention may also be implemented by other number of liquid crystal lens, reflectors, and reflectors.

Furthermore, as shown in FIG. 1B, when the illumination light emitted by the light emitting unit 110 of the present embodiment is transmitted along a pathway S1, the liquid crystal lens set 120 may deflect the illumination light not only toward the third direction d2 but also toward a first direction d3 perpendicular to both of the second direction d1 and the third direction d2 so that the illumination light is essentially transmitted along a pathway S2 after being emitted from the liquid crystal lens set 120.

In detail, in the illumination module of the first embodiment of the present disclosure, the first liquid crystal lens includes a first upper substrate, a first upper electrode layer disposed on the first upper substrate, a first liquid crystal layer, a first lower electrode layer and a first lower substrate where the first lower electrode layer is disposed. The second crystal lens includes a second upper substrate, a second upper electrode layer disposed on the second upper substrate, a second liquid crystal layer, a second lower electrode layer and a second lower substrate where the second lower electrode layer is disposed. In the following, the first liquid crystal lens will be used as an example with references made to the FIGs.

Figure 2A:
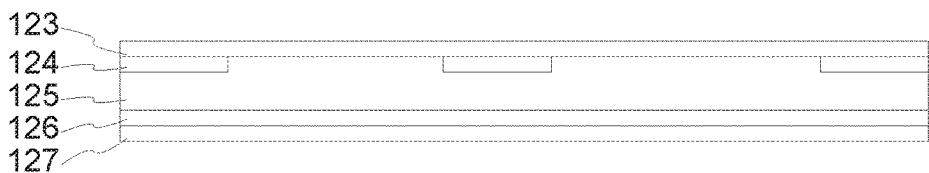
FIG. 2A is a diagram of the first liquid crystal lens in the first embodiment of the present disclosure.

FIG. 2A is a diagram of the first liquid crystal of the first embodiment of the present disclosure. Please refer to FIG. 2A. The first liquid crystal lens 121 includes a first upper substrate 123 and a first upper electrode layer 124 disposed on the first upper substrate 123. A first liquid crystal layer 125 is disposed between the first upper electrode layer 124 and the first lower electrode layer 126, and the first lower electrode layer 126 is disposed on the first lower substrate 127. The first lower electrode layer 126 is disposed between the first liquid crystal layer 125 and the first lower substrate 127, and the first liquid crystal layer 125 is disposed between the first upper electrode layer 124 and the first lower electrode layer 126 so that the moving of the liquid crystal molecular in the first liquid crystal layer 125 may be controlled by generating a potential difference between the first upper electrode layer 124 and the first lower electrode layer 126 so as to converge, diverge, or deflect the illumination light after the illumination light passes through the first liquid lens 121.

Similar to the first liquid crystal lens 121, the second liquid crystal layer in the second liquid crystal lens of the present embodiment is disposed between the second upper electrode layer and the second lower electrode layer so that movement of the liquid crystal molecular in the second liquid crystal layer may be controlled by generating a potential difference between the second upper electrode layer and the second lower electrode layer so as to converge, diverge, or deflect the illumination light after the illumination light passes through the second liquid crystal layer.

Figure 2B:
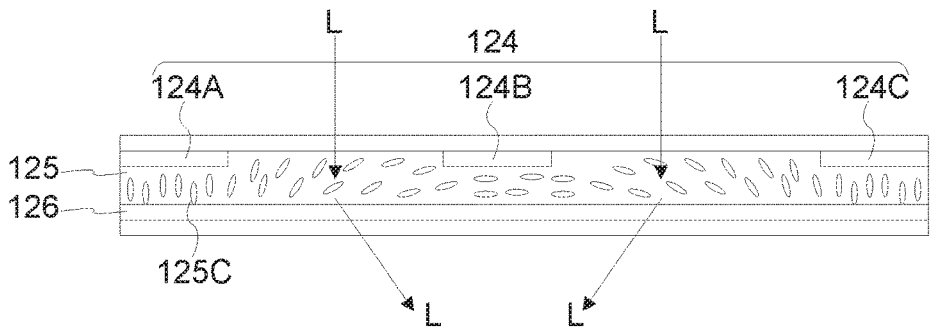
FIG. 2B is a diagram of the first liquid crystal lens converging a light in the first embodiment of the present disclosure.

In the following, the first liquid crystal lens 121 will be used as an example with references made to FIGs. FIG. 2B is a diagram of the first liquid crystal lens 121 converging the light in the first embodiment of the present disclosure. For example, referring to FIG. 2B, the first upper electrode layer 124 of the first liquid crystal lens 121 in the first embodiment of the present disclosure includes an electrode 124A, an electrode 124B, and an electrode 124C. In the present embodiment, a potential difference of VLC is generated between the electrode 124A and the first lower electrode layer 126; the potential difference of VLC is generated between the electrode 124C and the first lower electrode layer 126; the potential difference between the electrode 124B and the first lower electrode layer 126 is 0. Through the distribution of the potential differences, the arrangement direction of the liquid crystal molecular 125C in the first liquid crystal layer 125 in the middle area adjacent to the electrode 124B will be different from that in the surrounding area adjacent to the electrode 124A and 124C. Therefore, the light L will be converged after being transmitted through the first liquid crystal lens 121.

Figure 2C:
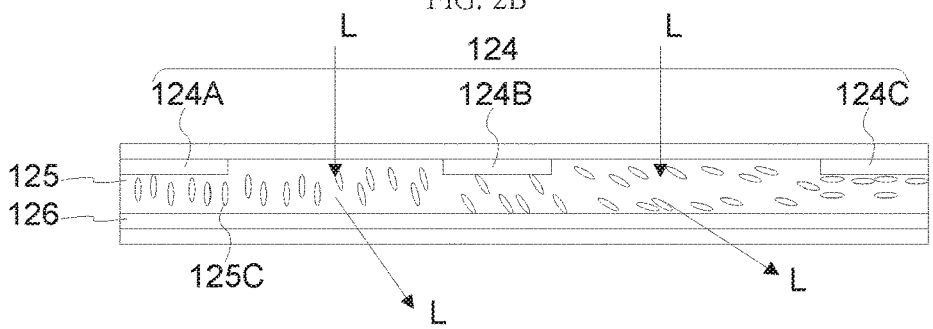
FIG. 2C is a diagram of the first liquid crystal lens deflecting a light in the first embodiment of the present disclosure.

FIG. 2C is a diagram of the first liquid crystal lens deflecting the light in the first embodiment of the present disclosure. Take another example, referring to FIG. 2C, in the first liquid crystal lens 121 of the first embodiment of the present disclosure, the potential difference of VLC is generated between the electrode 124A and the first lower electrode layer 126; the potential difference of 0.5 VLC is generated between the electrode 124B and the first lower electrode layer 126; the potential difference of zero is generated between the electrode 124C and the first lower electrode layer 126. Through the distributions of the potential differences, the arrangement direction of the liquid crystal molecular 125C in the first liquid crystal layer 125 is gradually changed in the areas adjacent to the electrode 124A, 124B, and 124C. Therefore, the light L will be deflected after being transmitted through the first liquid crystal lens 121.

Figure 2D:
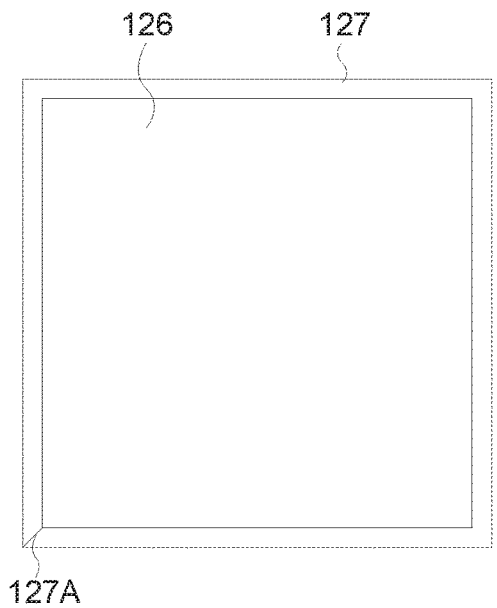
FIG. 2D is a diagram of a first lower electrode and a first lower substrate in the first embodiment of the present disclosure.

Furthermore, FIG. 2D is a diagram of the first lower electrode layer and the first lower substrate in the first embodiment of the present disclosure. Please refer to FIG. 2D. In the present embodiment, the first lower electrode layer 126 is disposed on the first lower substrate 127, and a wire 127A electrically connected to the first lower electrode layer 126 is formed on the first lower substrate 127. Preferably, the first lower electrode layer 126 is configured to apply a reference voltage so as to enable the first upper electrode layer to modulate the potential difference.

Figure 2E:
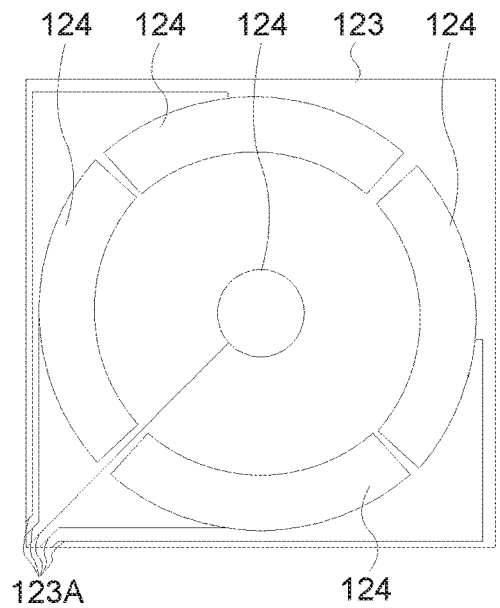
FIG. 2E is a diagram of a first upper electrode and a first upper substrate in the first embodiment of the present disclosure.

FIG. 2E is a diagram of the first upper electrode layer and the first upper substrate in the first embodiment of the present disclosure. Please refer to FIG. 2E. In the present embodiment, the first upper electrode layer 124 is disposed on the first upper substrate 123, and a plurality of wires 123A electrically connected to the first upper electrode layer 124 are formed on the first upper substrate 123, therefore the first upper electrode layer 124 and the first lower electrode layer 126 may generate different potential differences in the different areas between the first upper substrate 123 and the first lower substrate 127.

The Second Embodiment

Figure 3:
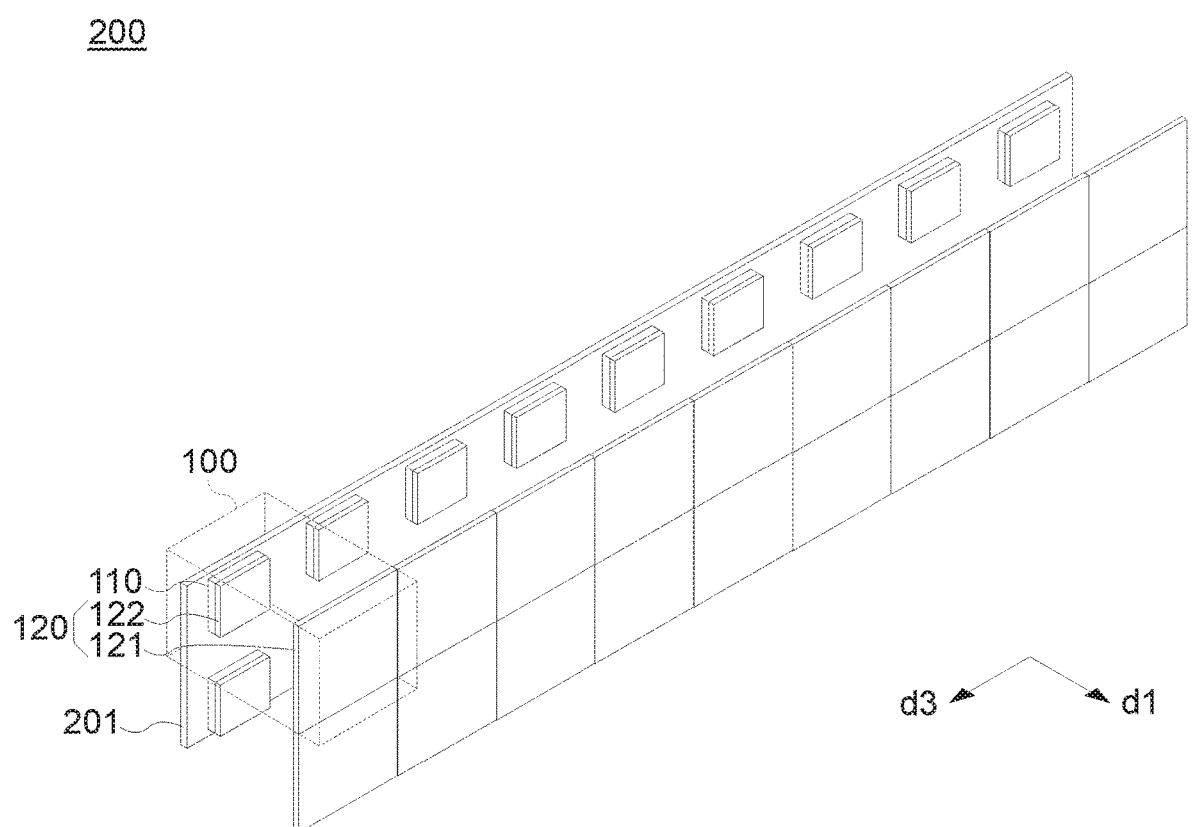
FIG. 3 is a diagram of the illumination device in the second embodiment of the present disclosure.

The illumination device provided by the present disclosure may provide suitable illumination via the illumination module 100. FIG. 3 is a diagram of an illumination device 200 in the second embodiment of the present disclosure. Please refer to FIG. 3. The illumination device 200 in the second embodiment of the present disclosure includes a plurality of illumination modules 100. The illumination modules 100, as mentioned above, include the light emitting unit 110 and the liquid crystal lens set 120, wherein, the liquid crystal lens set 120, as mentioned above, includes the first liquid crystal lens 121 and the second liquid crystal lens 122 as an example herein. In the present embodiment, the light emitting units 110 of the illumination modules 100 are arranged to form a light emitting array. Preferably, the light emitting units 110 are formed on a substrate 201 to form a light emitting array.

On the other hand, the liquid crystal lens sets 120 of the illumination modules 100 in the present embodiment are arranged to form a lens array so as to modulate the illumination light emitted by the light emitting array. In particular, in the present embodiment, each of the first liquid crystal lenses 121 of the liquid crystal lens sets 120 are formed to have the same rectangle shape, and the first liquid crystal lens 121 are arranged next to each other to form a lens array; similarly, each of the second liquid crystal lens 122 is also arranged to be a rectangle, and each of the second liquid crystal lens 122 is arranged to form a lens array respectively corresponding to their own light emitting units 110. The present disclosure is not limited to the aforementioned patterns; the first liquid crystal lens 121 and the second liquid crystal lens 122 may also take the shape of an approximate rectangle or other shapes. Since each of the illumination modules 100 may respectively converge, diverge, or deflect the illumination light through the lens array in the same or different ways, the illumination device 200 may suitably provide the illumination based on different requirements. It should be noted that, the present disclosure is not limited to the arrangement of the first liquid crystal lens 121 or the second liquid crystal lens 122; in another embodiment, the first liquid crystal lens 121 and the second liquid crystal lens 122 of the light emitting modules 100 may further be combined to form a lens array in another arrangement.

In particular, the illumination modules 100 transmitting the illumination light along the second direction d1 are arranged along the first direction d3 so that the light emitting units 110 are essentially arranged along the first direction d3 to form a light emitting array; the liquid crystal lens sets 120 are arranged along the first direction d3 to form a lens array, wherein the second direction d1 is perpendicular to the first direction d3. Thus, the illumination device 200 in the present embodiment may alter the intensity of the illumination light along the first direction d3 via the illumination modules 100.

In other words, in different irradiation areas along the first direction d3, different illumination modules 100 may emit illumination light of different intensities accordingly.

Figure 4A:
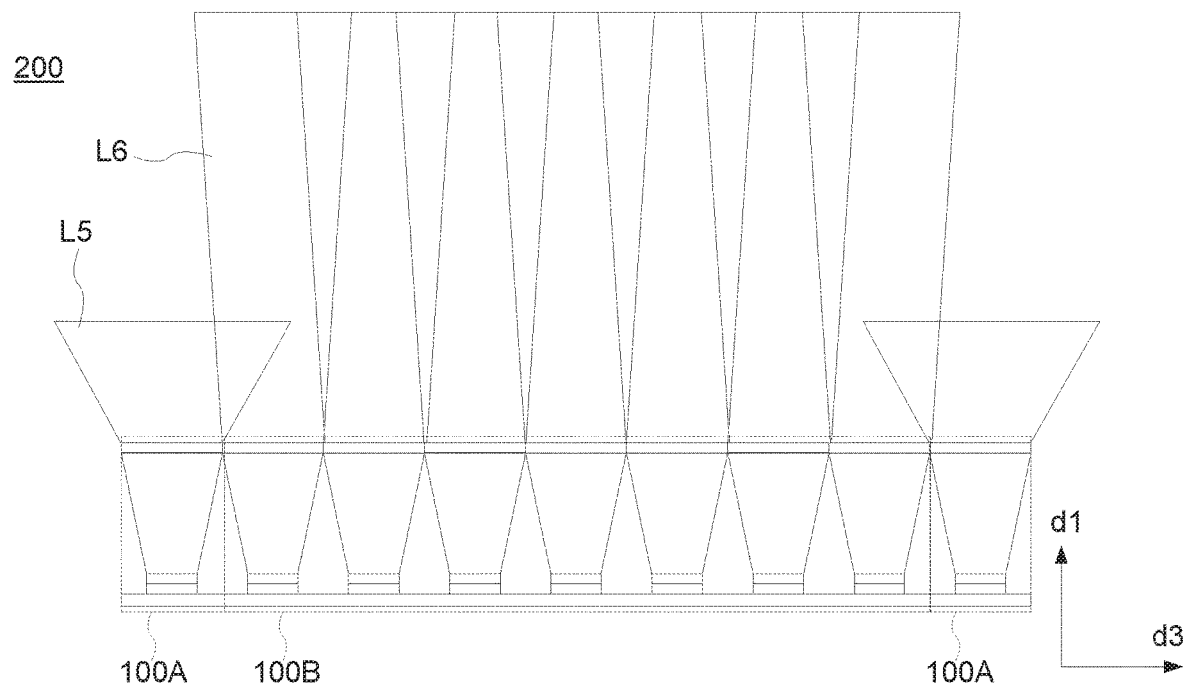
FIG. 4A is a diagram of the illumination device in the second embodiment of the present disclosure emitting an illumination light with the first mode.

FIG. 4A is a diagram of the illumination device 200 emitting the illumination light in the first mode in the second embodiment of the present disclosure. Please refer to FIG. 4A. In the illumination device 200 of the present embodiment, the divergence angle of the illumination light L5 transmitted through the liquid crystal lenses of the illumination modules 100A located at both ends along the first direction d3 is larger than the divergence angle of the illumination light L6 transmitted through the liquid crystal lenses of the illumination modules 100B located at the middle portion. In the first mode, since the illumination light L6 provided by the illumination modules 100B located at the middle portion can irradiate a farther area due to the small divergence angle, it may be used to irradiate the objects ahead; and since the illumination light L5 provided by the illumination modules 100A at both ends can irradiate a larger area due to the large divergence angle, it may be used to irradiate the objects on the two sides. In the embodiment of FIG. 4A, the light emitting units of the illumination modules 100A and the illumination modules 100B essentially emit light of the same intensity; however, the present disclosure is not limited thereto.

Figure 4B:
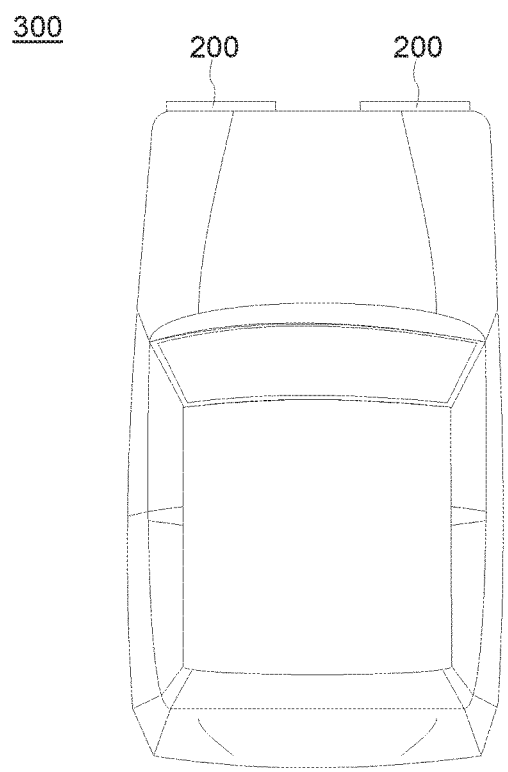
FIG. 4B is a diagram of a vehicle in the second embodiment of the present disclosure.

Furthermore, the illumination device 200 provided by the present embodiment may be applied in a vehicle to provide suitable illumination based on environmental status while the vehicle is being driven. For example, FIG. 4B is a diagram of a vehicle in the second embodiment of the present disclosure. Please refer to FIG. 4A and FIG. 4B. The vehicle 300 in the second embodiment of the present disclosure may include at least one illumination device 200; in the embodiment of FIG. 4B, two sets of the illumination devices 200 are taken as an example, but not limited thereto. Through the first mode, the vehicle 300 may provide the illumination light to irradiate front views suitably. In particular, in the illumination device 200, the illumination light L6 provided by the illumination modules 100B located at the middle portion may irradiate a distant road surface, and the illumination light L5 provided by the illumination modules 100A located at both sides may irradiate road surfaces at both sides so that a more suitable irradiation effect may be provided.

Figure 4C:
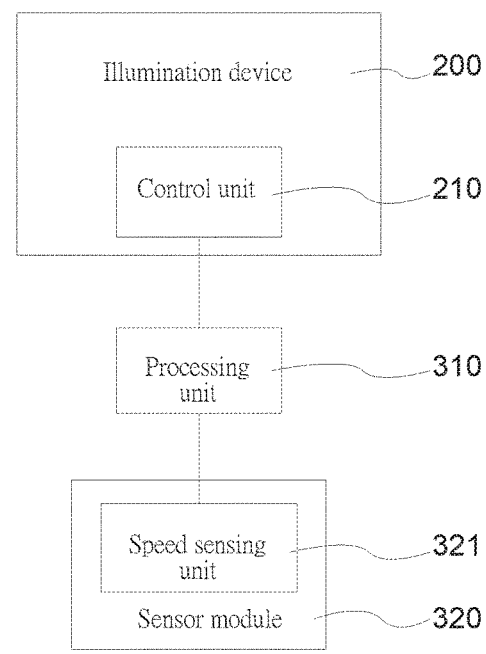
FIG. 4C is a systematic diagram of the vehicle in the second embodiment of the present disclosure.

FIG. 4C is a systematic diagram of the vehicle in the present embodiment. Please refer to FIGS. 4A, 4B and 4C together. In the present embodiment, the vehicle 300 includes an illumination device 200, a processing unit 310 and a sensor module 320, wherein the processing unit 310 is connected to the illumination device 200 and the sensor module 320.

In the present embodiment, the sensor module 320 may output a sensing signal to the processing unit 310, and the processing unit 310 may provide a control signal to the illumination device 200Based on the sensing signal. The illumination device 200 is configured to control the illumination modules 100A and 100B in the illumination device 200Based on the control signal. Each of the illumination light L5 and L6 are converged or diverged by controlling each liquid crystal lens sets of the illumination module 100A and 100B.

Preferably, the illumination device 200 of the present embodiment further includes a control unit 210 configured to transmit and process the control signal from the processing unit 310, but the present disclosure is not limited thereto. In the other hand, the sensor module 320 of the present embodiment may include a speed sensing unit 321 configured to provide speed information of the vehicle 300, and the sensing signal includes the speed information provided by the speed sensing unit 321. The processing unit 310 of the present embodiment may further modulate, via the control signal, the divergence angles of the illumination modules 100B located at the middle portion of the illumination device 200Based on the speed information.

Figure 5A:
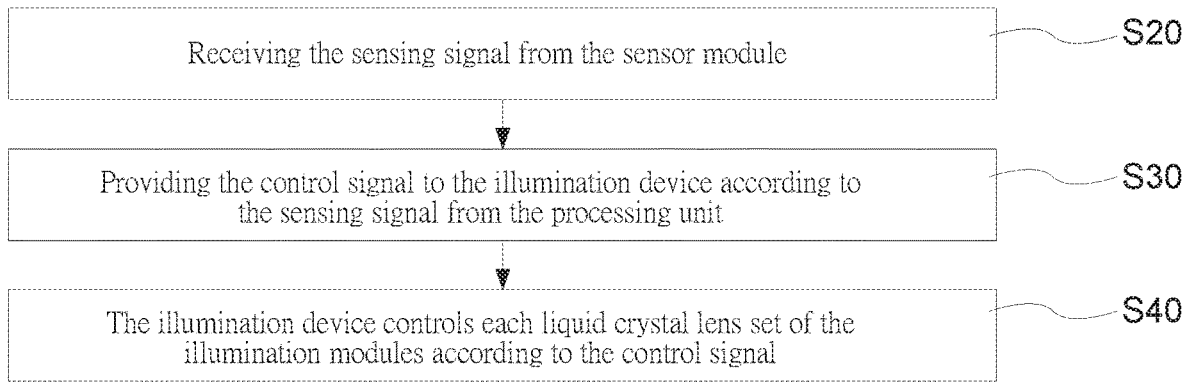
FIG. 5A is a flowchart of a method for driving the illumination device in the second embodiment of the present disclosure.

The present embodiment further provides a method for driving the illumination device 200 so that the illumination device 200 may provide suitable illumination according to environmental status. FIG. 5A is a flowchart of the method for driving the illumination device in the present embodiment. Please refer to FIG. 5A. In an embodiment of the present disclosure, the method for driving the illumination device includes: receiving the sensing signal from the sensor module (Step S20) and providing the control signal to the illumination device according to the sensing signal from the processing unit (Step S30). The illumination device of the present embodiment, similar to the aforementioned illumination device 200 of the first embodiment, includes a plurality of illumination modules, and each of the illumination modules includes a light emitting unit and a liquid crystal lens set. The light emitting units of the light illumination modules are arranged to form a light emitting array, and the liquid crystal lens sets of the illumination units are arranged to form a lens array. In the present embodiment, the illumination device controls each liquid crystal lens sets of the illumination modules according to the control signal (Step S40) so as to converge, diverge, or deflect the illumination light. Thus, the driving method of the present embodiment may enable the illumination device to provide suitable illumination according to different environmental statuses.

Figure 5B:
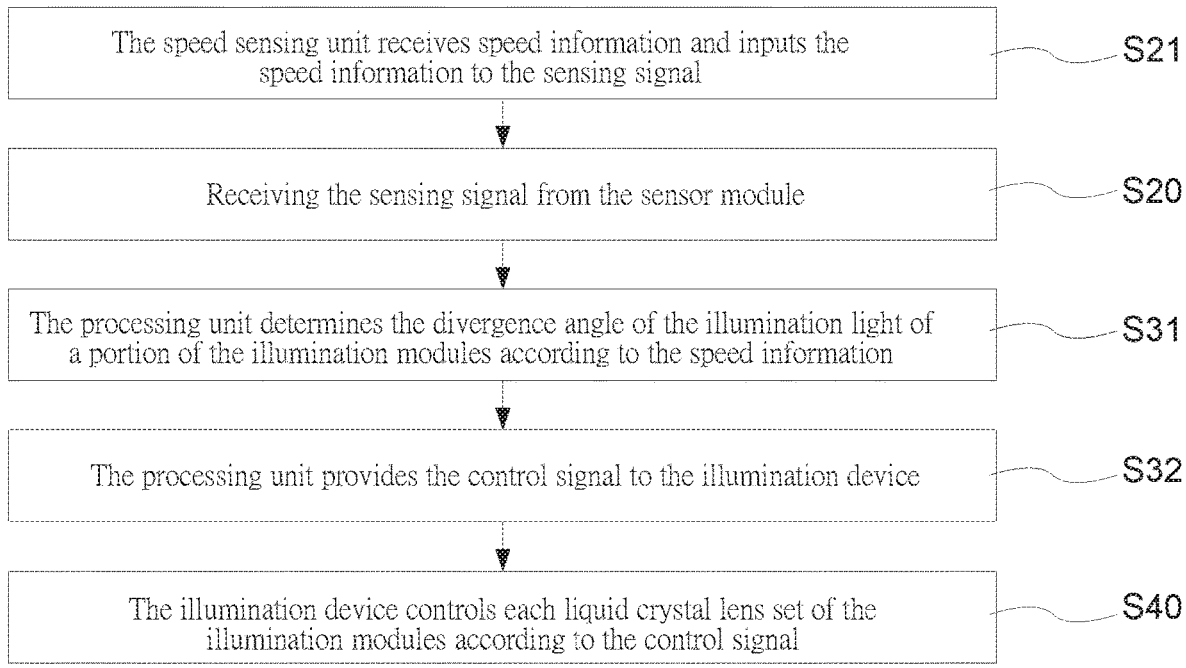
FIG. 5B is a flowchart of the method for driving the illumination device in the second embodiment of the present disclosure.

Preferably, the driving method provided by the present disclosure may further enable the illumination device to modulate the illumination light corresponding to the speed of the vehicle so that the divergence angle of the illumination light emitted by at least a portion of the illumination modules is decreased as the speed in the speed information is increased. FIG. 5B is a flowchart of the method for driving the illumination device in the first embodiment of the present disclosure. Please refer to FIG. 5B. The speed sensing unit 321 may receive speed information according to the speed of the vehicle and input the speed information to the sensing signal outputted by the sensor module 320 when the aforementioned vehicle 300 is driven (Step S21). The processing unit 310 is configured to determine the divergence angle of the illumination light of a portion of the illumination modules 100A and 100B according to the speed information in the sensing signal after receiving the aforementioned sensing signal from the sensor module 320 (Step S31). Preferably, the processing unit 310 is configured to provide a control signal corresponding to the higher speed in the speed information to decrease the divergence angle of the illumination light L6 emitted by the illumination modules 100B located at the middle portion so as to irradiate a farther distance; and the processing unit 310 is configured to provide a control signal corresponding to the low speed in the speed information to increase the divergence angle of the illumination light L5 emitted by the illumination modules 100A located at both ends so as to avoid interfering with drivers of other vehicles.

Figure 6A:
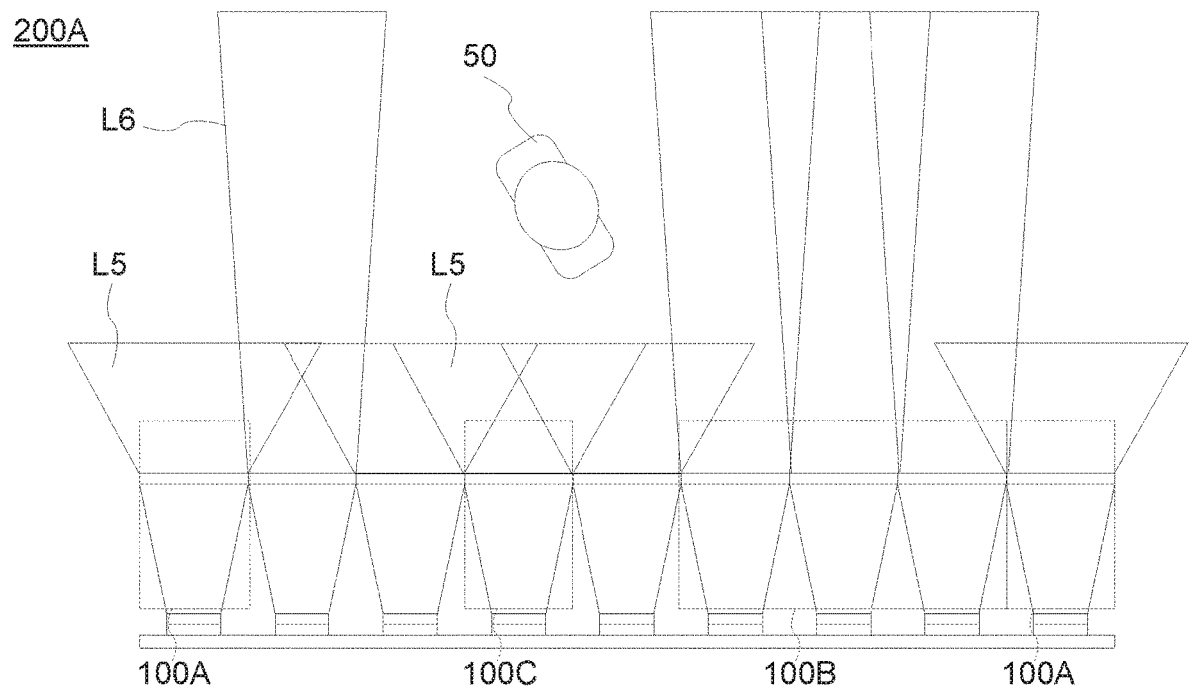
FIG. 6A is a diagram of the illumination device in the second embodiment of the present disclosure.

The vehicle in the present disclosure may further alter the divergence angle of the illumination light emitted by at least a portion of the illumination modules 100A and 100B in the illumination device 200 corresponding to vehicles or pedestrians in front of the vehicle 300. FIG. 6A is a diagram of the illumination device 200A of the present embodiment. Please refer to FIG. 6A. In the second embodiment of the present disclosure, when a pedestrian 50 is located in front of the illumination device 200A, the illumination device 200A not only may provide an illumination light of a greater divergence angle through the illumination module 100A located at both sides and provide an illumination light of a smaller divergence angle through the illumination module 100B located at the middle portion, but may also provide an illumination light of a greater divergence angle through the illumination module 100C that may irradiate the pedestrian 50 so as to avoid affecting the vision of the pedestrian 50. The present disclosure is not limited to altering the illumination light emitted by a portion of the illumination module 100C with respect to the pedestrian 50, it may also modulate the illumination light emitted by a portion of the illumination module 100C with respect to other vehicles.

Figure 6B:
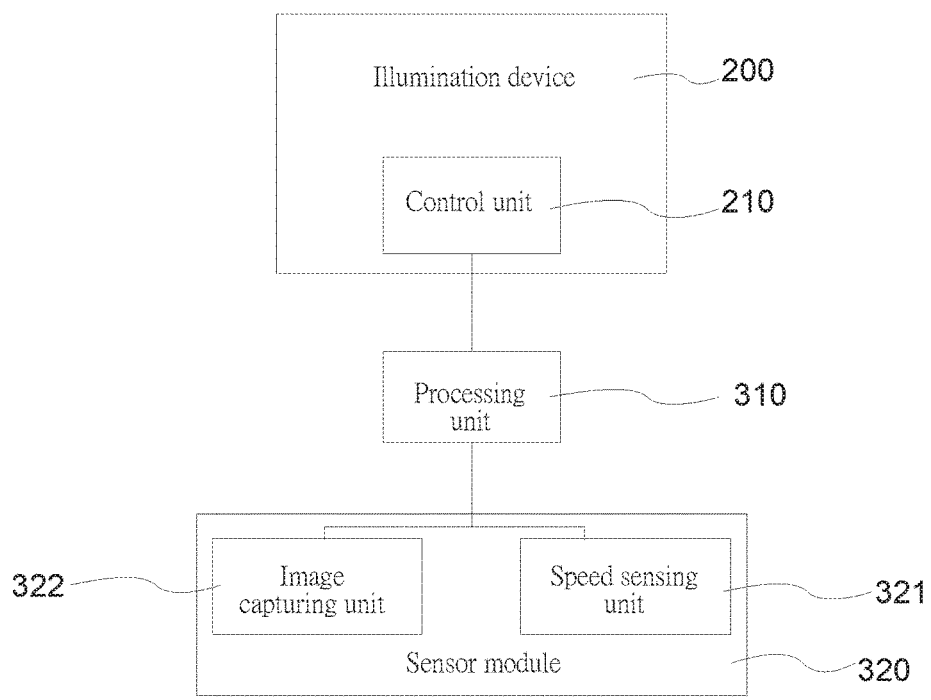
FIG. 6B is a systematic diagram of the vehicle in the second embodiment of the present disclosure.

FIG. 6B is a systematic diagram of the vehicle in a modified embodiment of the present disclosure. Please refer to FIG. 6A and FIG. 6B together. In the present embodiment, the sensor module 320 includes a speed sensing unit 321 and an image capturing unit 322. The image capturing unit 322 is configured to capture a detection image of the irradiation area of the illumination modules 100A, 100B, and 100C in front of the vehicle. In the present embodiment, the sensing signal includes the detected image. When the processing unit 310 determines that an observer (that is, the pedestrian 50) is located at the irradiation area according to the detected image, the processing unit 310 is configured to drive the lens array of the illumination device 200 in the second mode. As mentioned above, at least a portion of the illumination modules 100C configured to irradiate the observer (that is, the pedestrian 50) increases the divergence angle of the illumination light emitted by the portion of the illumination modules 100C in the second mode.

Figure 7:
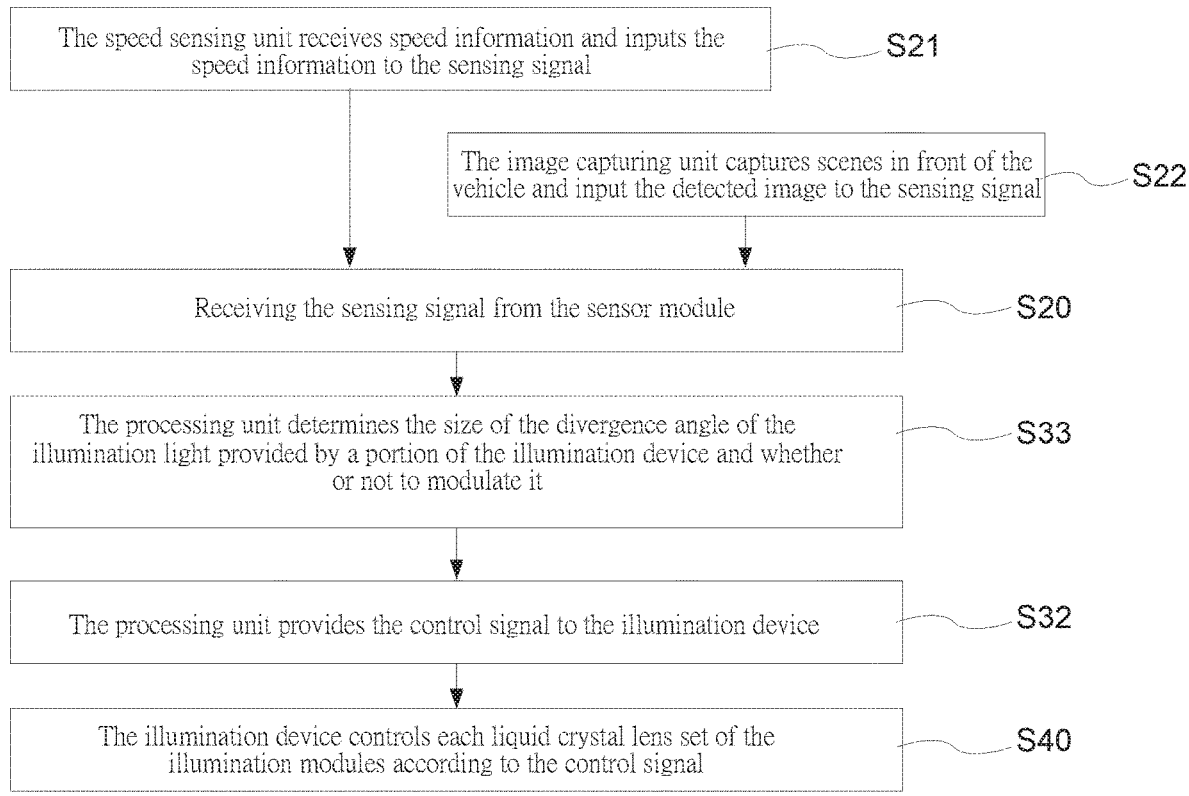
FIG. 7 is a flowchart of the method for driving the illumination device in the second embodiment of the present disclosure.

FIG. 7 is a flowchart of the method for driving the illumination device in the second embodiment of the present disclosure. Please refer to FIG. 7. In the present embodiment, the speed sensing unit firstly receives speed information according to the speed of the vehicle, and inputs the speed information to the sensing signal (Step S21); the image capturing unit captures scenes in front of the vehicle and input the detected image to the sensing signal (Step S22). The processing unit receives the sensing signal from the sensing module (Step S20), and the processing unit is configured to determine the size of the divergence of the illumination light provided by the illumination module located at the middle portion according to the speed information; then the processing unit determines whether or not to modulate the size of the divergence angle of the illumination light provided by a portion of the illumination device according to the detected image (Step S33). The processing unit provides the control signal to the illumination device (Step S32), then the illumination device controls each liquid crystal lens set of the illumination modules according to the control signal (Step S40).

Figure 8A:
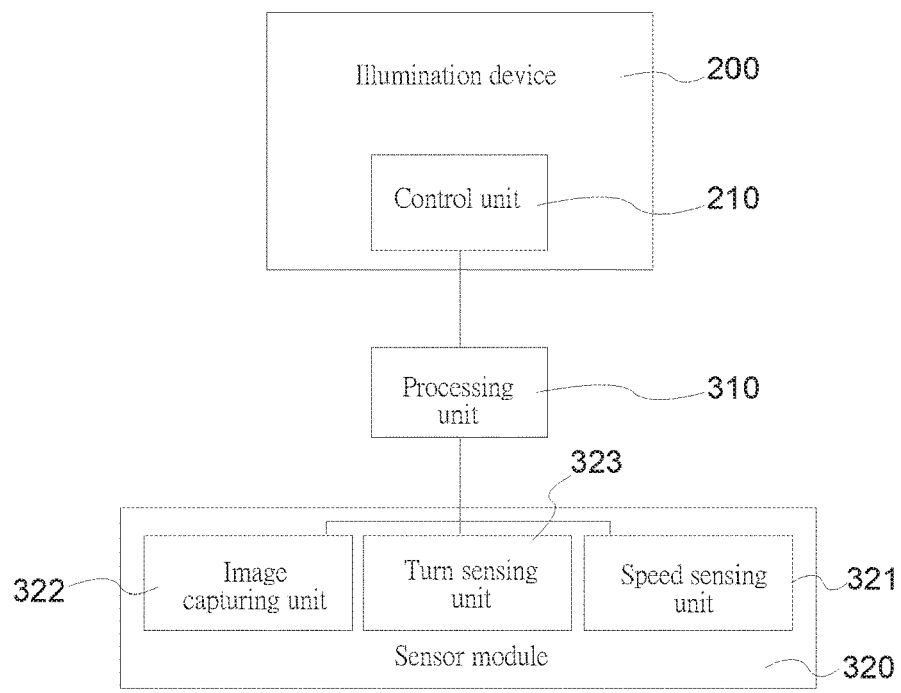
FIG. 8A is a systematic diagram of the vehicle in the second embodiment of the present disclosure.

The driving method provided by the present embodiment may further enable the vehicle to modulate the ways of illumination of the illumination module in the illumination device according to a turning direction. FIG. 8A is a systematic diagram of the vehicle in a modified embodiment of the present disclosure. Please refer to FIG. 8A. In the present embodiment, the sensor module 320 includes a speed sensing unit 321, an image capturing unit 322 and a turn sensing unit 323, wherein the turn sensing unit 323 is configured to provide the turning direction and a turning angle of the vehicle, the sensing signal provided by the sensor module 320 includes the turning direction information and the turning angle information.

Figure 8B:
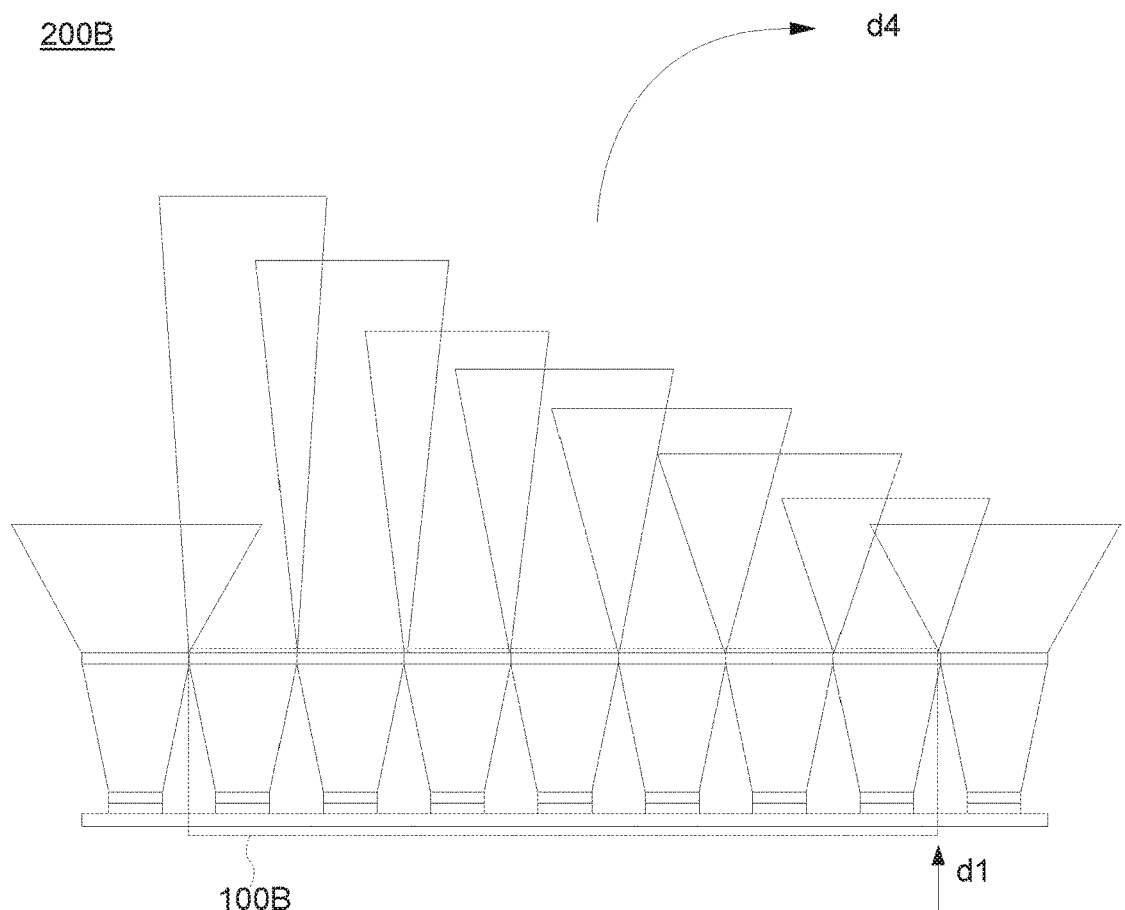
FIG. 8B is a diagram of the illumination device in the second embodiment of the present disclosure.

FIG. 8B is a diagram of the illumination device 200B in the present embodiment. Please refer to FIG. 8A and FIG. 8B together. When the processing unit 310 determines that the vehicle has made a turn based on the turning direction information and the turning angle information, the divergence angle of the illumination light transmitted from the liquid crystal lenses of the illumination modules 100B in the middle portion is increased toward a turning direction d4. In particular, the divergence angle of the illumination light of the illumination modules 100B in the present embodiment is increased along the first direction d3, therefore the inner region of the curved road may be irradiated suitably, and light may also be shone on the farther area in the outer region of the curved road.

Furthermore, the processing unit 310 may further drive the illumination device 200B with a third mode according to the turning direction and the turning angle provided by the turn sensing unit 323. In the illumination device 200B of the present embodiment, the illumination light of the illumination modules are transmitted along the second direction d1 in the first mode; each liquid crystal lens of the illuminant modules is configured to deflect the illumination light along a third direction in the third mode, wherein the third direction is perpendicular to the first direction d3 and the second direction d1.

Figure 9A:
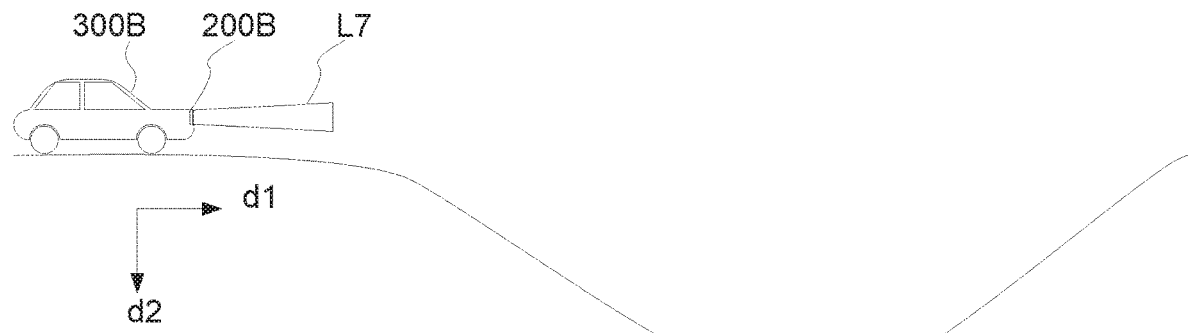
FIG. 9A to FIG. 9C are diagrams of the vehicle in the second embodiment of the present disclosure driven on each type of road surfaces.
Figure 9B:
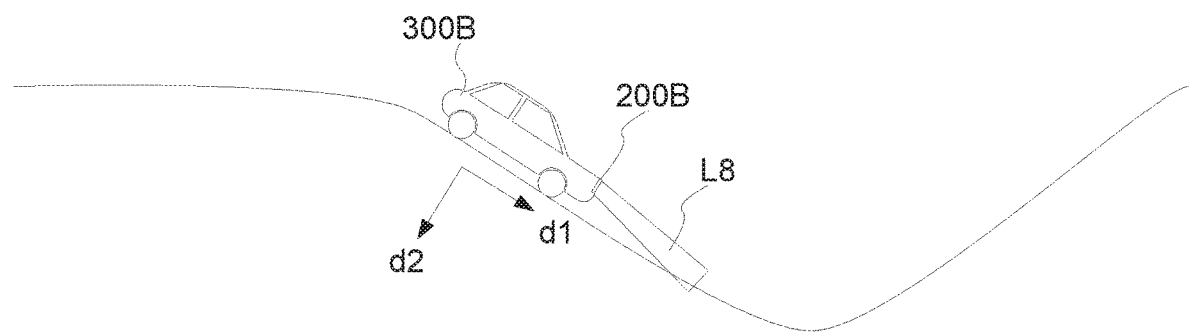
Figure 9C:
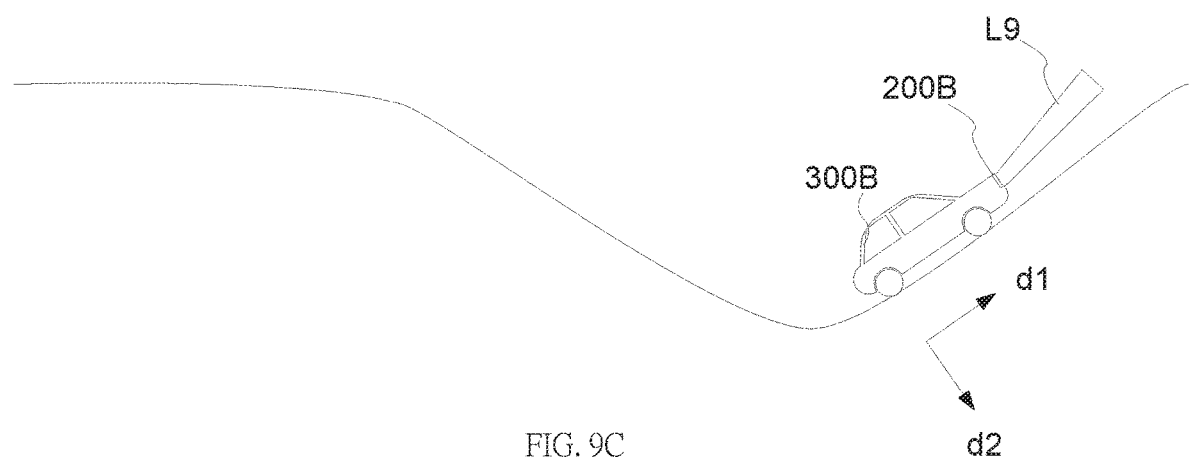

In particular, the illumination device 200B may further provide a suitable illumination effect by providing the corresponding illuminations based on whether the vehicle is being driven uphill or downhill. FIG. 9A to FIG. 9C are diagrams of the vehicle in the second embodiment of the present disclosure driven on each type of the road surfaces. Please refer to FIG. 9A. When the vehicle 300B of the present embodiment is driven on a flat surface, the illumination light L7 emitted by the illumination device 200B of the vehicle 300B is essentially transmitted along the second direction d1.

Please refer to FIG. 9B. When the vehicle 300B of the present embodiment is driven downhill, the liquid crystal lens sets of the illumination device 200B of the vehicle 300B may, through the turning direction and the turning angle provided by the turn sensing unit, deflect the light to the ground along the third direction d2, and further emit the illumination light L8. Through the illumination light L8, the vehicle 300B may provide a clearer illumination effect to the driver.

On the other hand, please refer to FIG. 9C. When the vehicle 300B of the present embodiment is driven uphill, the liquid crystal lens sets of the illumination device 200B of the vehicle 300B may deflect the light opposite to the third direction d2 and away from the ground, and further emit the illumination light L9 through the turning direction and the turning angle provided by the turn sensing unit. Through the illumination light L9, the vehicle 300B may provide a clearer illumination effect to the driver.

It should be noted that, in the illumination device of the present disclosure, the light emitting array is not limited to being formed by light emitting units emitting light of the same intensity. In another embodiment, the light emitting units in the light emitting array may emit illumination light of different intensities. The control signal received by the illumination device may further control each of the light emitting units of the illumination modules in the illumination device so as to control the intensities of the illumination light emitted by each light emitting units in the light emitting array. In the present disclosure, people skilled in the art may select suitable types of light emitting units as a light source in the illumination device.

In summary, the illumination module provided by embodiments of the present disclosure may converge, diverge, or deflect the light through the liquid crystal lens sets so as to provide various illumination effects. The illumination device provided by the present disclosure has a plurality of illumination modules, and each of the illumination modules may converge, diverge, or deflect the illumination light emitted by the illumination modules, and further satisfy the illumination requirements of more types of illumination lights. The vehicle provided by the embodiments of the present disclosure may provide suitable illumination effect through the illumination device based on different driving conditions so as to further support the driver. The method for driving the illumination device provided by the present disclosure may enable the illumination device to provide a plurality of illumination effects so as to provide more types of illumination lights to satisfy a diverse range of the illumination requirements.

What is claimed is:

1. An illumination module, comprising:
a light emitting unit emitting an illumination light; and
a first liquid crystal lens arranged corresponding to the light emitting unit, wherein the first liquid crystal lens receives the illumination light and is configured to converge, diverge or deflect the illumination light; and
a second liquid crystal lens disposed between the light emitting unit and the first liquid crystal lens, wherein the second liquid crystal lens receives the illumination light from the light emitting unit, and the first liquid crystal lens receives the illumination light from the second liquid crystal lens,
wherein the second liquid crystal lens is configured to modulate a distribution of the illumination light received by the first liquid crystal lens, and
wherein a distance d between the first liquid crystal lens and the second liquid crystal $$:0 \le d \le f_1 - v - \left(\frac{l'}{\tan\beta}\right),$$

lens satisfies the following relationship wherein $f_1$ is a focal length of the first liquid crystal lens, is the image distance of the second liquid crystal lens, l' is half of the imaging length of the second liquid crystal lens, and $\beta$ is half of the angle of the beam of the illumination light.

2. An illumination device, comprising:
a plurality of the illumination modules according to claim 1,
wherein the light emitting units of the illumination modules are arranged to form a light emitting array, the first liquid crystal lenses of the illumination modules are arranged to form a lens array.

3. The illumination device according to claim 2, wherein second liquid crystal lenses of the illumination modules are arranged to form another lens array.

4. The illumination device according to claim 2, wherein the illumination modules are arranged along a first direction; when the illumination device is in a first mode, a divergence angle of the illumination light transmitted by the first liquid crystal lenses at both ends in the first direction is larger than a divergence angle of the illumination light transmitted by the first liquid crystal lenses at a middle portion in the first direction.

5. The illumination device according to claim 4, wherein in the first mode, the illumination light of the illumination modules is transmitted along a second direction; in a third mode, each of the first liquid crystal lenses of the illumination modules is configured to deflect the illumination light along a third direction, and the third direction is perpendicular to the first direction and the second direction.

6. The illumination device according to claim 2, wherein when an observer is located on an irradiation area of the illumination device, the illumination device is driven with a second mode; in the second mode, a divergence angle of at least a portion of the illumination modules configured to irradiate to the observer is increased.

7. The illumination device according to claim 2, wherein in the light emitting array, the light emitting units are configured to emit the illumination light of different intensities, respectively.

8. The illumination device according to claim 2, wherein in the lens array, at least two of the first liquid crystal lenses are configured to provide the illumination light of different convergences, divergences or deflections.

9. A vehicle, comprising:
    the illumination device according to claim 2;
    a sensor module outputting a sensing signal; and
    a processing unit connected to the sensor module and the illumination device,
    wherein the processing unit is configured to provide a control signal to the illumination device according to the sensing signal; the illumination device is configured to control each of the first liquid crystal lenses of the illumination modules according to the control signal so as to converge, diverge or deflect the illumination light.

10. The vehicle according to claim 9, wherein a first direction is parallel to a ground on which the vehicle runs.

11. The vehicle according to claim 9, wherein the sensor module comprises:
    a speed sensing unit configured to provide speed information of the vehicle, wherein the sensing signal comprises the speed information, and a divergence angle of the illumination light emitted by at least a portion of the illumination modules is decreased as a speed in the speed information is increased.

12. The vehicle according to claim 9, wherein the sensor module comprises:
    an image-capturing unit configured to capture a detection image of the irradiation area of the illumination modules in front of the vehicle; the sensing signal comprises the detection image,
    wherein when the processing unit determines that an observer is in the irradiation area based on the detection image, the processing unit is configured to drive the illumination device with a second mode, and a divergence angle of at least a portion of the illumination modules configured to irradiate to the observer is increased in the second mode.

13. The vehicle according to claim 9, wherein the sensor module comprises:
    a turn-sensing unit configured to provide a turning direction and a turning angle of the vehicle; the sensing signal comprises turning direction information and turning angle information, wherein when the processing unit determines that the vehicle turns to a direction based on the turning direction information and the turning angle information, a divergence angle of the illumination light transmitted from the first liquid crystal lenses in a middle portion is increased toward the direction.

14. The vehicle according to claim 9, wherein the sensor module comprises:
    a turn-sensing unit configured to provide a turning direction and a turning angle of the vehicle; the sensing signal comprises turning direction information and turning angle information;
    when the processing unit determines that the vehicle is being driven in a downhill or an uphill based on the turning direction information and the turning angle information, the processing unit drives the illumination device with a third mode, wherein each of the first liquid crystal lenses of the illumination module is configured to deflect the illumination light along a third direction in the third mode, and the third direction is perpendicular to the first direction and an advancing direction of the vehicle.

15. The vehicle according to claim 14, wherein when the vehicle is driven in the downhill, the processing unit is configured to drive the illumination device to deflect the illumination light toward a ground; when the vehicle is driven in the uphill, the processing unit is configured to drive the illumination device to deflect the illumination light away from the ground.

16. A method of driving the illumination device of claim 2, comprising:
    receiving a sensing signal from a sensor module; and
    providing a control signal to the illumination device according to the sensing signal by a processing unit,
    wherein the illumination device is configured to control each of the first liquid crystal lenses of the illumination modules according to the control signal so as to converge, diverge or deflect the illumination light.

17. The method according to claim 16, further comprising:
    driving the illumination device with a first mode, a second mode or a third mode according the control signal by the processing unit.

18. The method according to claim 17, further comprising:
    determining that an observer is located in an irradiation area of the illumination device based on the sensing signal by the processing unit; and
    providing the control signal to the illumination device by the processing unit so that the illumination device drives the lens array with the second mode.

19. The method according to claim 16, further comprising:
    controlling the light emitting units of the illumination modules according to the control signal by the illumination device so that at least two of the light emitting units in the light emitting array respectively emit the illumination light with different intensities.

* * * * *